United States Patent [19]
Farina

[11] Patent Number: 5,118,923
[45] Date of Patent: Jun. 2, 1992

[54] LASER ANNEALED OPTICAL DEVICES MADE BY THE PROTON EXCHANGE PROCESS

[75] Inventor: James D. Farina, Tolland, Conn.

[73] Assignee: United Technologies Corporation, Hartford, Conn.

[21] Appl. No.: 650,432

[22] Filed: Feb. 4, 1991

[51] Int. Cl.⁵ .............................................. G01J 1/32
[52] U.S. Cl. ................................ 250/205; 219/121.65
[58] Field of Search ........................ 250/201.1, 227.11; 219/121.65, 121.66, 121.8, 121.85; 350/96.12, 96.15

[56] References Cited

U.S. PATENT DOCUMENTS 4,472,456 9/1984 Shah ................................ 219/121.65
4,727,237 2/1988 Schantz ........................ 219/121.65

Primary Examiner—David C. Nelms
Assistant Examiner—K. Shami

[57] ABSTRACT

The present invention can be utilized for altering the optical characteristics (e.g. refractive index) of selected regions of planar and channel waveguide structures fabricated by the Proton Exchange (PE) process from materials such as $LiNbO_3$ or $LiTaO_3$. The present invention employs localized surface heating from the absorption of optical radiation in an annealing process. Simultaneous alteration and monitoring of the optical characteristics of optical waveguide structures in these integrated optical devices is also provided, thereby allowing closed loop or active trimming of waveguide parameters 33 Claims, 2 Drawing Sheets

NUMBER OF EXPOSURES

□ $C = I_1/(I_1+I_2)$   + POWER OUT $(I_1+I_2)$

LASER ANNEALED OPTICAL DEVICES MADE BY THE PROTON EXCHANGE PROCESS

TECHNICAL FIELD

The present invention relates to integrated optical devices in general and in particular to integrated optical devices made by proton exchange and annealed for enhanced performance.

BACKGROUND OF THE INVENTION

Individual optical devices in optical circuits are giving way to integrated optical devices in much the same manner as their semiconductor counterparts did in the past. These optical circuits comprise waveguides, directional couplers as well as optical sources. At present, integrated optical devices comprise a substrate on which a small number of components are fabricated. The exact characteristics of an integrated optical circuit are difficult to predict because of the sensitivity of waveguide parameters to slight variations in the fabrication process. This has forced integrated optic (IO) manufacturers to accept low yields and avoid 10 circuits which contain too many (greater than 2) critical components such as directional couplers.

Recently, the Annealed Proton Exchange (APE) process has been developed for LiNbO$_3$ and LiTaO$_3$ integrated optic fabrication. The APE process has eased the fabrication constraints by allowing the fabricator to trim the entire circuit by annealing the device in an oven to achieve greater diffusion of the exchange ion. The known method of annealing results in an optical index of refraction profile which has a lesser gradient in the index of refraction of the waveguide (delta n), and larger device crossection with that change of refractive index. This process works quite well except that it is not possible to selectively anneal localized regions of the circuit. Furthermore, circuit annealing while monitoring its characteristics is extremely cumbersome, since it takes place in a 300°-400° C. oven.

Very often, the waveguide characteristics are fairly sensitive to the anneal times and the results of a short anneal may not be easily predicted. In critical applications, the devices must be benched tested and trimmed by a further annealing step. Up until now, the annealing process has been done in an oven, at temperatures between 300° and 400° C. and there has been no demonstration of a method which would allow the annealing of IO waveguides while monitoring their progress. A method and apparatus for selectively annealing small sections of an IO circuit device while monitoring a relevant optical circuit parameter would alleviate many if not all of these problems. Its impact on integrated optics would be analogous to active trimming of thick and thin film resistors in the electronics component and hybrid industries. The present invention is directed towards such a device.

Related subject matter can be found in the commonly owned U.S. Pat. No. 4,953,935 entitled "Integrated Optic Star Coupler", and U.S. patent applications Ser. Nos. 329,121 entitled "Single Polarization Integrated Optical Components for Optical Gyroscopes" and 329,123 entitled "Low Loss Proton Exchanged Waveguides for Active Integrated Optic Devices", all incorporated herein by reference.

SUMMARY OF THE INVENTION

An object of the present invention is to provide a method and apparatus for locally modifying optical characteristics of an integrated optical device.

Another object of the present invention is to provide a method and apparatus of the foregoing type which is adapted to selectively anneal portions of an integrated optical device that has a plurality of optical structures therein.

Still another object of the present invention is to provide a method and apparatus of the foregoing type which is adapted to provide active trimming of the optical characteristics of integrated optical devices.

According to the present invention, a method of actively selecting a value of an optical parameter of an optical structure in an integrated optical device includes the steps of providing an optical signal for transiting the optical structure measuring a first initial value of the optical parameter and irradiating a portion of a top surface of the optical structure with radiation from an optical source. Further, the method includes the steps of measuring a second value of the optical parameter during the irradiation, comparing the second optical parameter value to a preselected value of the optical parameter and adjusting the optical source radiation in accordance with the optical parameter value comparison.

According to another aspect of the present invention, an integrated optical device having an optical structure includes a substrate and a waveguide formed in a top surface thereof. The optical structure is characterized by an optical parameter having a value selected in accordance with a method including the steps of providing an optical signal for transiting the optical structure, measuring a first initial value of the optical parameter and irradiating a portion of the top surface of the optical structure with radiation from an optical source. The method also includes measuring a second value of the optical parameter during the irradiation, comparing the second measured optical parameter value to a preselected value of the optical parameter and adjusting the optical source radiation in accordance with the optical parameter value comparison.

According to yet another aspect of the present invention, an apparatus for use in selecting the value of an optical parameter of an optical structure in an integrated optical device includes a mechanism for providing an optical signal to transit through the optical structure and a detector for measuring the optical signal after transiting through the optical structure and providing electrical signal equivalents thereof. The apparatus further includes a mechanism responsive to control signals for providing optical radiation to a portion of a top surface of the optical structure and a controller. The controller is provided for determining a first initial value of the optical parameter from the detector signals, comparing the measured optical parameter signals with signals corresponding to a preselected optical parameter value and providing the control signals to the optical radiation mechanism to adjust the optical radiation in dependence on the optical parameter signal comparison.

DESCRIPTION OF THE PREFERRED EMBODIMENT

The present invention provides a method and apparatus by which the index of refraction profile and therefore the optical characteristics of proton exchanged regions of integrated optic devices fabricated from materials such as $LiNbO_3$ or $LiTaO_3$ can be modified using the localized surface heating resulting from the absorption of optical radiation. The techniques of the present invention can be utilized to alter the optical characteristics of selected regions of planar and channel waveguide structures fabricated by the proton Exchange (PE) Process. Furthermore, simultaneous alteration and monitoring of the optical characteristics of waveguide structures is also provided, thereby allowing closed loop or active trimming of waveguide parameters. The present invention represents an important departure from the prior ar in the manufacture of integrated optical circuits and components. Previously there existed no technique for selective annealing of PE optical waveguides.

Figure 1:
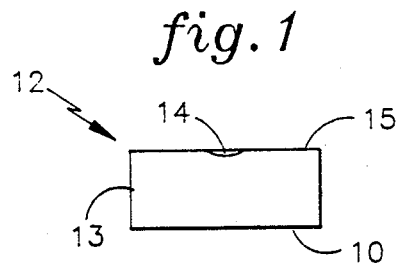
FIG. 1 is a simplified diagrammatic illustration of an ion diffused waveguide region in an integrated optical device before annealing.
Figure 2:
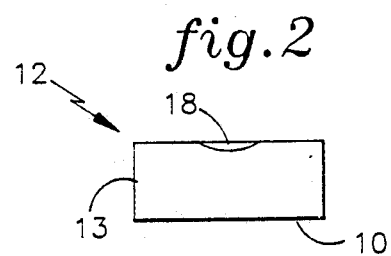
FIG. 2 is a simplified diagrammatic illustration of an ion diffused waveguide region in the integrated optical device of FIG. 1 after annealing.

Referring now to FIGS. 1 and 2 there is schematically shown a cross section of an optical structure 10, part of an integrated optical device 12. The device 12 is of a known type preferably fabricated by the PE Process on a substrate 13 comprised of, for example, $LiNbO_3$ or $LiTaO_3$. In the device of FIG. 1 it is assumed that the substrate is X-cut crystal. Alternatively, Z-cut or y-cut crystals may be used. A waveguide region 14 is formed in the device using known techniques. In sum, the fabrication process begins with the deposition of a masking layer of aluminium (Al), chromium (Cr) or an equivalent material on a substrate top surface 15. The masking layer is patterned and substrate material is etched to form waveguide channels in the region 14. Channel widths vary with the intended guided signal wavelength and typically range between 3 to 10 microns. The masking pattern limits proton exchange to the etched channels. The substrate is preferably immersed in an acid bath for a time ranging from two to sixty minutes. In the case of molten benzoic acid, the bath is at a temperature in the range of from 150° C. to 250° C. In the prior art, the substrate is then annealed at a temperature of between 300° to 400° C. for one to five hours. Often acids such as sulfuric acid can be equivalently substituted with appropriate changes to the process parameters.

The annealed proton exchange process (APE) locally increases the extraordinary refractive index within the waveguide channels and locally decreases the ordinary refractive index. As a result, for the device of FIGS. 1 and 2 it is possible to support a guided optical mode polarized along the Z or extraordinary axis by total internal reflection. Those skilled in the art will note that to make active integrated optical devices according to the present invention such as fiber optic gyroscopes (FOG), intensity or phase modulators and switching networks, a metallic electrode pattern is formed by known deposition and photolithographic methods.

Figure 3:
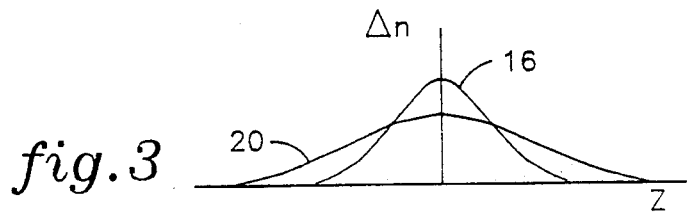
FIG. 3 is a diagrammatic illustration of waveguide refractive index profiles across the integrated optical device of FIGS. 1 and 2 before and after annealing.
Figure 4:
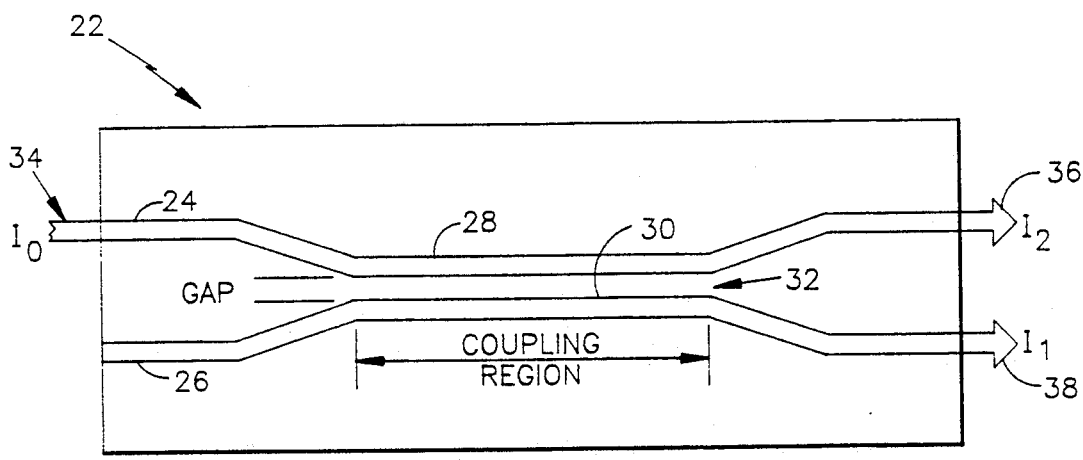
FIG. 4 is a top view of a portion of a directional coupler provided by the present invention.

As seen in FIG. 3 at curve 16, the refractive index profile across the device is fairly sharp. However, after an anneal process in which the device has been heated, the waveguide region 18 in FIG. 2 is more extensive, and the refractive index profile has been broadened as indicated at curve 20 in FIG. 3. An example of an IO structure is a directional coupler 22 as shown in FIG. 4. Directional couplers often require trimming in the fabrication process of optical parameters such as the refractive index profile to control the amount of optical coupling between adjacent waveguides. The directional coupler comprises first and second waveguides 24, 26 which have corresponding coupling regions 28, 30 that are separated by a gap 32 of a selected magnitude. The waveguide 24 is adapted to receive an input optical signal 34 and provide two output signals 36 (11) and 38 (12), with optical signal 38 comprising a portion of the input beam. In the directional coupler, the coupling ratio (11/12) is dependent on the overlap of the optical modes in the coupling region which, in turn, is governed by the separation and length of the waveguides in the coupling region and the size of the optical modes of the two guides. If too little power is split off in these couplers, it is possible to anneal the entire chip to increase the splitting. However, it is impractical to expect to perform this operation in a volume manufacturing line. Typically there are more than one such directional coupler on each integrated optical device, and very often several in an individual optical circuit. In this situation, the fabricator is constrained to anneal all of the devices simultaneously. At best, a compromise between all of the splitting ratios of the directional couplers can be reached.

Active modification or trimming of APE integrated optical devices including those made from $LiNbO_3$ and $LiTaO_3$ can be accomplished by selectively heating the desired area of a device with electromagnetic radiation such as that provided by a laser. If the wavelength is such that the light is absorbed (e.g. >5um), the temperature of the illumination area of the device will rise. Furthermore, if the exposure time is short, the resultant heating will be fairly localized. It has been believed by those skilled in the art that localized surface heating of $LiNbO_3$ integrated optical devices such as by a $CO_2$ laser beam having a wavelength of 10.6 um would result in the formation of stress cracks. However, as demonstrated by the present invention, power densities of about 25 kW/cm$^2$ result in an actually melt of the crystal structure of the integrated optical device in a 25-50 um region without any visible evidence of damage to the adjacent areas. Further, the present invention demonstrates that it is feasible to use a laser beam for the annealing process which takes place at much lower temperatures.

Figure 5:
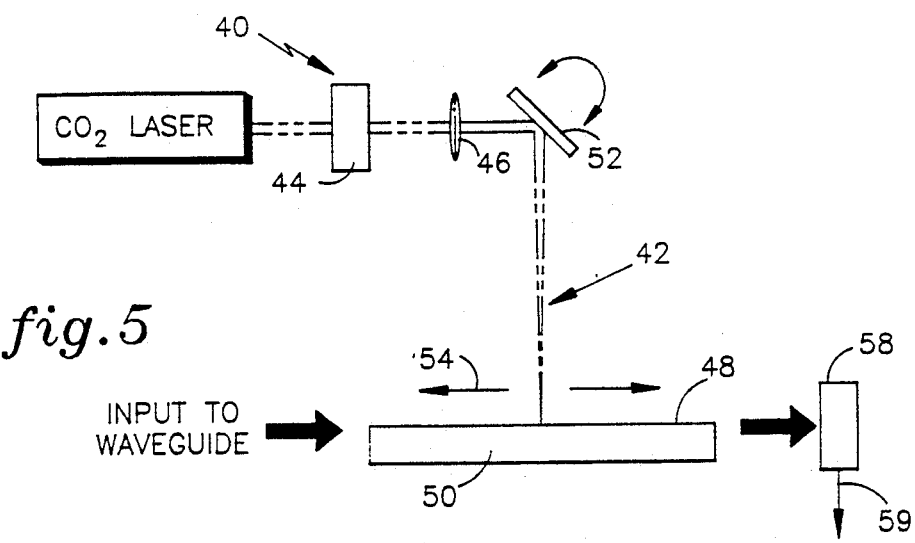
FIG. 5 is a schematic illustration of an apparatus for selectively annealing portions of a integrated optical device as provided by the present invention.

FIG. 5 shows an annealing apparatus 40 provided according to the present invention. A $CO_2$ laser beam 42 operating at a wavelength of 10.6 um is passed through an attenuator 44 and is focused by lens 46 to a spot size of approximately 50 um on an upper surface 48 of a $LiNbO_3$ channel waveguide device 50. The laser beam is scanned by means of rotating mirror 52 across the surface along a portion of the length of the waveguide about scan axis 54. The output beams are presented to a detector apparatus 58 which provides electrical signal equivalents on line 59 to external signal processing apparatus. After the focused laser beam has been scanned, the mode structure output beams is monitored for any changes in shape. At a laser power of about 100 mW and a scan speed of about 1 mm/sec the waveguiding properties of the device are completely destroyed after several scans without causing any structural damage. This is evidenced by the continual increase in the mode size until there is no well defined mode at all. This condition indicates that the refractive index profile due to the original APE process is washed out due to the over annealing effect of the laser heating process.

Figure 6:
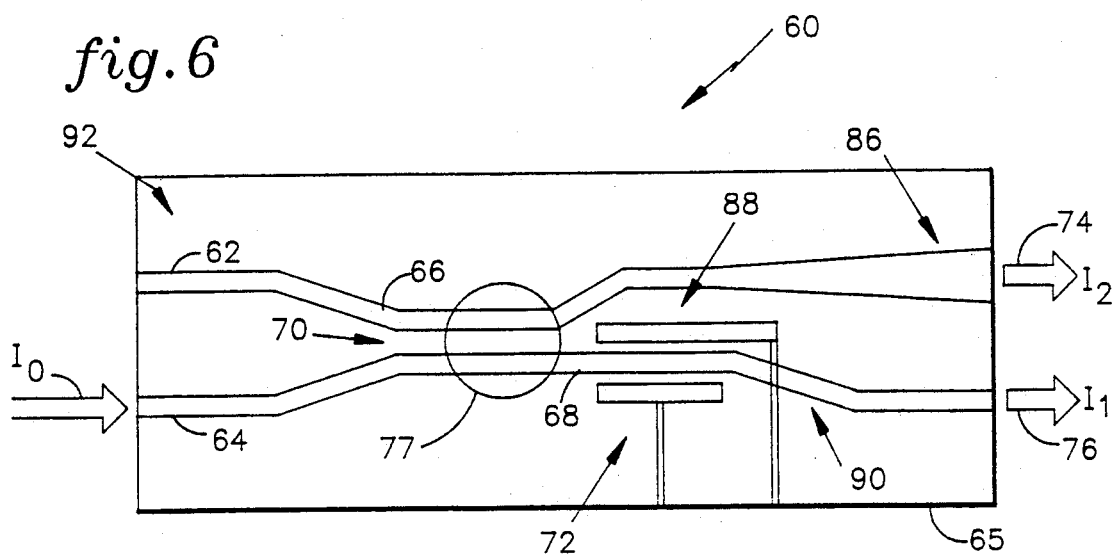
FIG. 6 is a top view of a portion of a second directional coupler provided by the present invention.

A second integrated optical device 60 provided according to the present invention is illustrated in FIG. 6. The device is similar to that of FIG. 4 and comprises first and second optical waveguides 62, 64 which are fabricated in a top surface of a substrate 65. The device has further undergone the proton exchange process described above. The optical waveguides include coupling regions 66, 68, respectively which are spaced from one another by a gap 70. In the device 60, the coupling region 66 is not coextensive with that of coupling region 68. A transducer 72 is provided to provide for modulation of the coupled beam. A detector (not shown) generates electrical signal equivalents of the output beams 74, 76 for use by other host equipment not shown and not part of the present invention. With an optical signal traversing one of the input waveguides an output beam is monitored before during and after individual passes of a focussed $CO_2$ laser beam 77 having a power of a few hundred milliwatts.

Figure 7:
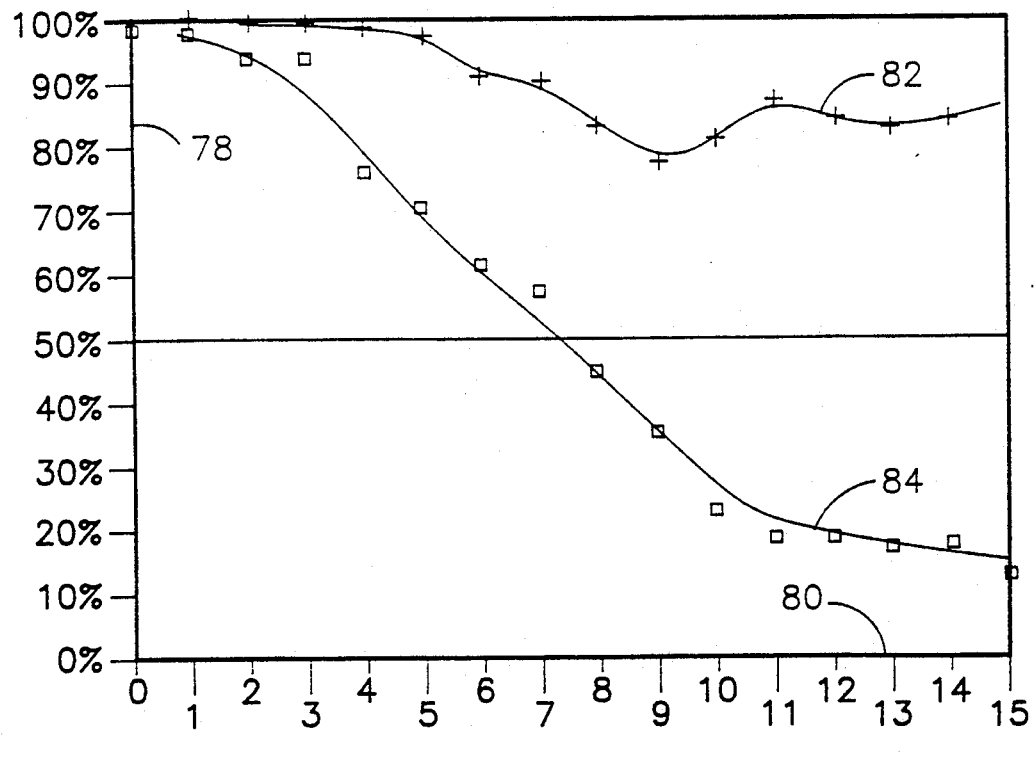
FIG. 7 is a diagrammatic illustration of the percent change in refractive index as a function of annealing exposures for the device of FIG. 4.

FIG. 7 illustrates the effect of this anneal process. The total normalized output power and the coupling ratio ($C = I1/(I1+I2)$) is plotted versus the number of exposures on axes 78 and 80, respectively. During each pass of the laser beam, a sharp change in the output power (curve 82) in each of the output beams is detected, with a continuing change for about 30-45 seconds after completion of the scan. At the end of this transient, the coupling ratio settled to a new constant value as indicated along curve 84. An incremental decrease in the coupling ratio was observed after each pass of the laser beam. Since the optical coupling was chosen to be near 100% cross coupling initially, an enhancement of the coupling (i.e., decrease in Lo) would be expected to result in the observed decrease in the coupling ratio, C. Furthermore, the slow decrease in the total transmitted power is more likely due to a decrease in the degree of optical confinement of the mode than waveguide loss due to some damage mechanism. An observation of the splitting or coupling ratio of the laser annealed device over a full 24 hours showed no change in the device parameters.

Although in the preferred embodiment the laser is scanned along a scan axis coextensive with the coupling regions, those skilled in the art will note that other portions of the device can receive the optical radiation in the annealing process to effect similar changes in the optical parameters of the device. These include regions 86-92 shown in FIG. 6. Other sources of radiation can be equivalently substituted depending on the device materials. With the present invention, the delivery of the optical radiation which causes the heating can be delivered in a variety of ways. A large area or the entire device can be illuminated while the area in which no annealing is desired can be masked off with a reflective or heat conducting layer. The laser radiation can be imaged in the shape of the area to be annealed. Similarly, the laser can be focussed to a spot and held stationary with respect to the IO device. The laser can be focussed and scanned over the desired area or the laser can be focussed and held stationary while the device is moved. In another alternative configuration, the focussed laser spot can be scanned over the device while its intensity is varied to achieve illumination in the desired annealing area.

The requirement that the laser radiation have a wavelength which is absorbed directly by the substrate material is desired but the surface of the device can be treated by, for example, the application of an absorptive coating. This would allow higher spatial resolution through the use of shorter wavelength radiation sources which would ordinarily not be absorbed or would otherwise damage the substrate material.

The present invention can also be utilized as a novel method to produce variations in waveguide crossectional dimensions, such as tapers. In fact, this technique can be utilized in the manufacture of any PE device structure and for either the primary method for annealing or simply a final tuning or trimming step. It can be used to tune the characteristics of any device whose operation depends on mode size, mode shape, waveguide index profile, or effective refractive index. Such devices include all IO modulators and switching devices as well as passive waveguide structures.

As detailed above, with the addition of the appropriate detector signal feedback the present invention can be utilized in an active fashion in the manufacture of any IO device structure requiring precise control of waveguide characteristics. The IO device can be operating while the annealing is taking place. If the relevant parameter, such as splitting ratio, modulator bias point, optical throughput or electro-optic efficiency is monitored, the measured parameter value can be compared to the desired value and used to regulate the position, intensity or scan speed of the laser illumination to achieve the desired amount of annealing.

Similarly, although the invention has been shown and described with respect to a preferred embodiment thereof, it should be understood by those skilled in the art that various other changes, omissions and additions thereto may be made therein without departing from the spirit and scope of the present invention. Although the preferred embodiment anticipates the use of a proton exchange process, those skilled in the art will note that the present invention can be adapted for use With any technique for altering a device optical parameter controlled by thermal annealing.

I claim:

1. A method of actively selecting a value of an optical parameter of an optical structure in an integrated optical device, comprising the steps of:

providing an optical signal for transiting said optical structure;

measuring a first initial value of said optical parameter;

irradiating a portion of a top surface of said optical structure with radiation from an optical source;

measuring a second value of said optical parameter during said irradiation;

comparing said second optical parameter value to a preselected value of said optical parameter; and adjusting said optical source radiation in accordance with said optical parameter value comparison.

2. The method of claim 1 wherein said optical structure comprises first and second optical waveguides formed in a top surface of said integrated optical device, said optical waveguides having respective portions thereof spaced from one another to provide optical coupling therebetween.

3. The method of claim 2 wherein said optical structure comprises an optical coupler.

4. The method of claim 1 wherein said optical parameter comprises an index of refraction of a portion of said optical structure.

5. The method of claim 2 wherein said optical structure further comprises a $LiNbO_3$ substrate.

6. The method of claim 2 wherein said optical structure further comprises a $LiTaO_3$ substrate.

7. The method of claim 2 wherein said optical structure is fabricated by a process including the steps of proton exchange (PE).

8. The method of claim 7 wherein said proton exchange steps further comprises the steps of:

masking said integrated optical device to leave a portion of said optical structure exposed; and immersing said integrated optical device in benzoic acid at a temperature of between 150° to 250° C. for between two to sixty minutes.

9. The method of claim 2 wherein said optical source radiation generates a localized zone of melting in said optical coupler of between 25 and 50 microns in extent.

10. The method of claim 2 wherein said optical source radiation is provided to a second portion of said waveguides displaced from said first portion.

11. The method of claim 2 wherein said optical radiation is provided from a $CO_2$ laser at a wavelength of 10.6 microns.

12. The method of claim 2 wherein said radiation is provided at a 50 micron spot to said top surface at a power of approximately 100 mW and wherein said method further comprises the steps of scanning said optical source radiation along said top surface.

13. A method of selecting a value of an optical parameter of an optical structure, comprising the steps of:

irradiating a portion of a top surface of said optical structure with radiation from an optical source;

measuring a value of said optical parameter after said irradiation step;

comparing said measured optical parameter value to a preselected value of said optical parameter; and irradiating said optical structure again if said measured optical parameter value is not approximately equal to said preselected optical parameter value.

14. The method of claim 13 wherein said optical structure comprises first and second optical waveguides formed in a top surface of said integrated optical device, said optical waveguides having respective portions thereof spaced from one another to provide optical coupling therebetween.

15. The method of claim 14 wherein said optical structure comprises an optical coupler.

16. The method of claim 13 wherein said optical parameter comprises an index of refraction of a portion of said optical structure.

17. The method of claim 14 wherein said optical structure further comprises a $LiNbO_3$ substrate.

18. The method of claim 14 wherein said optical structure further comprises a $LiTaO_3$ substrate.

19. The method of claim 14 wherein said optical structure is fabricated by a process including the steps of proton exchange (PE).

20. An integrated optical device having an optical structure comprising;

a substrate;

a waveguide means formed in a top surface of said substrate;

said optical structure characterized by an optical parameter having a value selected in accordance with a method comprising the steps of:

providing an optical signal for transiting said optical structure;

measuring a first initial value of said optical parameter;

irradiating a portion of said top surface of said optical structure with radiation from an optical source;

measuring a second value of said optical parameter during said irradiation;

comparing said second optical parameter value to a preselected value of said optical parameter; and adjusting said optical source radiation in accordance with said optical parameter value comparison.

21. The device of claim 20 wherein said optical structure comprises an optical coupler having first and second waveguides having corresponding portions spaced from one another to provide optical coupling therebetween.

22. The device of claim 20 wherein said optical parameter comprises an index of refraction of a portion of said optical structure.

23. The device of claim 21 wherein said substrate comprises $LiNbO_3$.

24. The device of claim 21 wherein said substrate comprises $LiTaO_3$.

25. The device of claim 21 wherein said optical structure is fabricated by a process including the steps of proton exchange (PE).

26. The device of claim 25 wherein said proton exchange steps further comprises the steps of:

masking said integrated optical device to leave a portion of said optical structure exposed; and immersing said integrated optical device in benzoic acid at a temperature of between 150° to 250° C. for between two to sixty minutes.

27. The device of claim 21 wherein said optical source radiation generates a localized zone of melting in said optical coupler of between 25 and 50 microns in extent.

28. The device of claim 21 wherein said optical source radiation is provided to a second portion of said waveguides displaced from said first portion.

29. The device of claim 21 wherein said optical radiation is provided from a $CO_2$ laser at a wavelength of 10.6 microns.

30. The device of claim 21 wherein said radiation is provided at a 50 micron spot to said top surface at a power of approximately 100 mW.

31. The device of claim 21 wherein said integrated optical device further comprises a plurality of optical structures formed in said substrate top surface.

32. An apparatus for use in selecting the value of an optical parameter of an optical structure in an integrated optical device, said apparatus comprising:

a means for providing an optical signal to transit through said optical structure;

a detector means for measuring said optical signal after transiting through said optical structure and providing electrical signal equivalents thereof;

a means responsive to control signals for providing optical radiation to a portion of a top surface of said optical structure; and a controller means for determining a first initial value of said optical parameter from said detector means signals, comparing said measured optical parameter signals with signals corresponding to a preselected optical parameter value and providing said control signals to said optical radiation means for adjusting said optical radiation in dependence on said optical parameter signal comparison.

33. In an integrated optical device having a plurality of optical structures therein, a method of actively selecting a value of an optical parameter of an optical structure in an integrated optical device, comprising the steps of:

providing an optical signal for transiting a selected one of said optical structures;

measuring a first initial value of said optical parameter;

irradiating a portion of a top surface of said selected optical structure with radiation from an optical source;

measuring a second value of said optical parameter during said irradiation;

comparing said second optical parameter value to a preselected value of said optical parameter; and adjusting said optical source radiation in accordance with said optical parameter value comparison.

* * * * *